United States Patent
Miyahara et al.

(10) Patent No.: US 9,157,486 B2
(45) Date of Patent: Oct. 13, 2015

(54) PIPE-SHAPED HOLDER FOR WORK MACHINE

(71) Applicant: Yamabiko Corporation, Tokyo (JP)

(72) Inventors: Yoichi Miyahara, Hiroshima (JP); Tomoki Ito, Tokyo (JP); Masanori Ohtani, Tokyo (JP); Shunsuke Nakadate, Tokyo (JP)

(73) Assignee: Yamabiko Corporation, Tokyo (JP)

( * ) Notice: Subject to any disclaimer, the term of this patent is extended or adjusted under 35 U.S.C. 154(b) by 95 days.

(21) Appl. No.: 13/676,775

(22) Filed: Nov. 14, 2012

(65) Prior Publication Data

US 2013/0121753 A1 May 16, 2013

(30) Foreign Application Priority Data

Nov. 15, 2011 (JP) ................. 2011-249465

(51) Int. Cl.
  *B25F 5/00* (2006.01)
  *F16D 11/00* (2006.01)
  *A01D 34/90* (2006.01)

(52) U.S. Cl.
  CPC .............. *F16D 11/00* (2013.01); *A01D 34/905* (2013.01); *B25F 5/006* (2013.01); *Y10T 403/10* (2015.01)

(58) Field of Classification Search
  USPC .......................................... 403/226, 365, 372
  See application file for complete search history.

(56) References Cited

U.S. PATENT DOCUMENTS

| 3,096,106 | A | * | 7/1963 | Wanner ......................... 403/197 |
| 4,338,064 | A | * | 7/1982 | Carmel ..................... 416/134 R |
| 4,817,738 | A | * | 4/1989 | Dorner et al. .............. 173/162.1 |
| 5,774,993 | A | * | 7/1998 | Schlessmann ................... 30/276 |
| 5,855,069 | A | * | 1/1999 | Matsubayashi et al. ........ 30/276 |
| 6,213,677 | B1 | * | 4/2001 | Yamane et al. ............... 403/329 |
| 6,550,145 | B2 | * | 4/2003 | Stoll et al. ........................ 30/276 |
| 7,266,892 | B2 | * | 9/2007 | Racov et al. ..................... 30/276 |
| 7,338,380 | B2 | * | 3/2008 | Byerly et al. ................... 464/89 |
| 2010/0293795 | A1 | * | 11/2010 | Nishiura et al. ............. 30/277.4 |

FOREIGN PATENT DOCUMENTS

| EP | 0925716 A1 | 6/1999 |
| JP | S59-23924 U | 2/1984 |

(Continued)

OTHER PUBLICATIONS

Extended European Search Report issued in corresponding European Patent Application No. 12192764.4 dated Sep. 19, 2014 (6 pages).

*Primary Examiner* — Michael P Ferguson
*Assistant Examiner* — Daniel Wiley
(74) *Attorney, Agent, or Firm* — Kilyk & Bowersox, P.L.L.C.

(57) ABSTRACT

A pipe-shaped fixture (100) to be attached to a housing (120) of a work machine includes a fixture body (102) having a front-end projection (110) and a rear-end projection (112) that make front and rear limits of a rubber cushion (104) that encloses the fixture body (102) closely and circumferentially. The front- and rear-end projections (110, 112) are connected to each other by a plurality of longitudinally extending ridges (114) formed at circumferential intervals. The ridges (114), front- and rear-end projections (110, 112) define a plurality of concavities (116) surrounded thereby on the outer circumference of the fixture body (102). The front- and rear-end projections (110, 112) cause longitudinal vibration of an operation rod (130) relative to the housing (120) to act as a compression force on the rubber cushion (104), and thereby suppress longitudinal vibration of the operation rod (130) while maintaining effects of suppressing horizontal and vertical vibrations.

4 Claims, 13 Drawing Sheets

(56) References Cited

FOREIGN PATENT DOCUMENTS

| | | | |
|---|---|---|---|
| JP | H01-121318 U | 8/1989 |
| JP | H06-054617 A | 3/1994 |
| JP | 09-303354 | 11/1997 |
| JP | 2007-068408 A | 3/2007 |

\* cited by examiner

PIPE-SHAPED HOLDER FOR WORK MACHINE

FIELD OF THE INVENTION

The present invention generally relates to a powered work machine. More particularly, the present invention relates to a pipe-shaped fixture for detachably fixing a sheath of an operation rod, in which a power transmission member extends, to a housing of a work machine having a connection/disconnection mechanism between a power source and the power transmission member.

BACKGROUND OF THE INVENTION

Brush cutters are well known as a kind of powered work machines. These brush cutters include typically a two-stroke air-cooled engine of which the output is transmitted to a cutting blade through a power transmission member provided in a long operation rod. The blade is thus rotated axially to cut grass and bushes.

As disclosed in Japanese Patent Laid-Open Publication No. H 9(1997)-303354 (Patent Document 1), the operation rod is detachably connected to a housing (cover member) of the power source. More specifically, the engine power is outputted through a centrifugal clutch. The operation rod is detachably connected to the housing that encloses the centrifugal clutch. In this mechanism of connection, the housing has a cylindrical fixing portion projecting and opening forward. The operation rod is inserted and fixed with its rear end in a pipe-shaped fixture fixed to the cylindrical fixing portion, whereby the operation rod is fixed to the housing. Of course, when the operation rod is fixed to the cylinder, the power transmission member, i.e. a rotating shaft, provided in the operation rod is mechanically connected to an output shaft of the centrifugal clutch.

The retaining rib formed at a lengthwise intermediate position of a fixture body of a connecting structure disclosed in Patent Document 1 is shown in FIG. 8. In this illustration, reference numeral 1 denotes a housing, and reference numeral 2 denotes a sheath of an operation rod, in which a power transmission member extends. As shown, a rubber cushion 3 is interposed between the sheath 2 and housing 1. The rubber cushion 3 forms a part of a pipe-shaped fixture 4.

As shown, the pipe-shaped fixture 4 includes a cylindrical main body 5 of the pipe-shaped fixture 4 (hereafter called fixture body 5). By tightening bolt-and-nut engagement using a bolt hole 6 formed at the front end portion of the fixture body 5, the pipe-shaped fixture 4 can be reduced in diameter to secure the operation rod 2 at the rear end thereof. The rubber cushion 3 is firmly fixed to the fixture body 5. Specifically, the rubber cushion 3 is formed by putting the fixture body 5 into a forming die and filling the forming die with melted rubber.

FIGS. 9 and 10 show the fixture body 5 and rubber cushion 3 used in the conventional pipe-shaped fixture 4. As shown, the rubber cushion 3 is formed on the fixture body 5 except the front end portion of the latter and has a size large enough to cover the rear end face of the fixture body 5. Also seen in FIGS. 8 to 10, a circumferential retaining rib 7 is formed at a lengthwise intermediate position of the fixture body 5.

Referring back to FIG. 8, the housing 1 includes a cylindrical fixing portion 8 projecting and opening forward. The pipe-shaped fixture 4 is inserted into the cylindrical fixing portion 8. The cylindrical fixing portion 8 has an inner circumference tapered rearward, namely, toward its deep end, and the rubber cushion 3 of the pipe-shaped fixture 4 has an outer circumference tapered complementarily to the inner circumference of the cylindrical fixing portion 8. When the pipe-shaped fixture 4 is inserted into the cylindrical fixing portion 8, the outer circumference of the rubber cushion 3 gets in close contact with the inner circumference of the cylindrical fixing portion 8.

As shown in FIG. 8, the cylindrical fixing portion 8 has a circumferential groove 9 formed in the inner circumference near its front end. By inserting the pipe-shaped fixture 4 into the cylindrical fixing portion 8 of the housing 1 and then installing a snap ring 10 in the circumferential groove 9, the pipe-shaped fixture 4 is fixed to the cylindrical fixing portion 8 and restrained by the snap ring 10 not to disengage from the cylindrical fixing portion 8.

By interposing the rubber cushion 3 between the operation rod 2 and housing 1, vibration of an engine (not shown) can be limited from being transmitted to the sheath of the operation rod 2, which encloses the power transmission member, and vibration of the operation rod 2 can be limited from being transmitted to the housing 1.

SUMMARY OF THE INVENTION

Problems to be Solved by the Invention

Vibration characteristics of the shoulder type brush cutter using the conventional pipe-shaped fixture 4 described above with reference to FIGS. 9 and 10 are shown in FIGS. 11 to 13. FIGS. 11 to 13 show vibration measured at a grip attached to the operation rod 2, which is the portion for the worker to hold with his/her hand to handle the operation rod 2. For the measurement, an imbalance mass of 1.3 g was intentionally attached to the rotating blade. FIG. 11 shows "horizontal" vibration. The term "horizontal" used herein in conjunction with vibration direction means a direction parallel to lateral movements of the operation rod 2 occurring when the worker moves it right and left. FIG. 12 shows "vertical" vibration. The term "vertical" used herein in conjunction with vibration direction means a direction parallel to up and down movements of the operation rod 2 occurring when the worker moves it up and down for cutting grass, for example. FIG. 13 shows "longitudinal" vibration. The term "longitudinal" used herein in conjunction with vibration direction means a direction parallel to the lengthwise direction of the operation rod 2.

It is known from FIGS. 11 to 13 that the conventional pipe-shaped fixture can effectively suppress the horizontal and vertical vibrations throughout low to high vibration ranges of the engine, but does not attain a satisfactory result with the longitudinal vibration. As shown, the longitudinal vibration apparently becomes larger in the high revolution range of the engine, and an improvement is desirable in this respect.

As shown in FIG. 9, the rubber cushion 3 is provided between the fixture body 5 and cylindrical fixing portion 8 (housing 1) both being hard, and this structure causes a radial compression force to act on the rubber cushion 3. That is, the rubber cushion 3 is certainly effective to suppress the vertical and horizontal vibrations of the operation rod 2.

However, with respect to the longitudinal vibration, the rubber cushion exhibits a different aspect. More specifically, since longitudinal vibration of the operation rod 2 and cylindrical fixing portion 8 acts in a direction likely to shear the rubber cushion 3, the conventional structure shown in FIGS. 9 and 10 exhibits the tendency that the natural vibration frequency in the longitudinal direction of the rubber cushion 3 becomes lower. This is the reason of the results described above with reference to FIG. 13. That is, FIG. 13 shows a result of resonance of the rubber cushion 3 with the vibration frequency in the high revolution range of the engine.

The Inventors of the present invention tried to overcome the above-mentioned drawbacks by increasing the hardness of the rubber cushion 3. This trial certainly succeeded in suppressing resonance with the longitudinal vibration; however, the vibration suppressing effect by the rubber cushion 3 rather degraded because the spring constant to the horizontal and vertical vibrations became higher than an optimal magnitude.

It is therefore desirable to provide a pipe-shaped fixture capable of suppressing the longitudinal vibration of a powered work machine while maintaining the effect of suppressing its horizontal and vertical vibrations.

Means for Solution of the Problems

The object of the present invention can be achieved by providing a pipe-shaped fixture to be attached in a cylindrical fixing portion of a housing of a work machine to detachably connect an operation rod to the work machine, comprising:

a fixture body which receives a rear end portion of the operation rod and holds it therein removably;

a rubber cushion closely enclosing an outer circumference of the fixture body; and a snap ring which is snap-fitted in a circumferential groove of said cylindrical fixing portion of the housing after said fixture body is inserted in the cylindrical fixing portion, wherein said fixture body includes a front-end projection located near a front end of the rubber cushion, a rear-end projection located near a rear end of the rubber cushion and ridges extending longitudinally from the front-end projection to the rear-end projection to connect these projections.

According to the present invention, the front- and rear-end projections can damp longitudinal vibration of a sheath of the operation rod relative to the cylindrical fixing portion of the housing as a compression force acting on the rubber cushion. Since this feature contributes to suppressing lowering of the natural frequency of the rubber cushion, resonance can be inhibited to occur in the longitudinal vibration without using a hard material as the rubber cushion. As to the horizontal and vertical vibrations, since a compression force acts on the rubber cushion like in the prior art, the rubber cushion maintains the same effect of suppressing the vibrations. Therefore, according to the present invention, it is possible to suppress all of horizontal, vertical and longitudinal vibrations by the rubber cushion.

Other objects, features and advantages of the present invention will become apparent from the detailed explanation of a specific embodiment made below.

DETAILED DESCRIPTION OF THE INVENTION

Embodiments of the present invention are described in detail below with reference to the accompanying drawings. The drawings, however, should not be construed to limit the invention.

Figure 1:
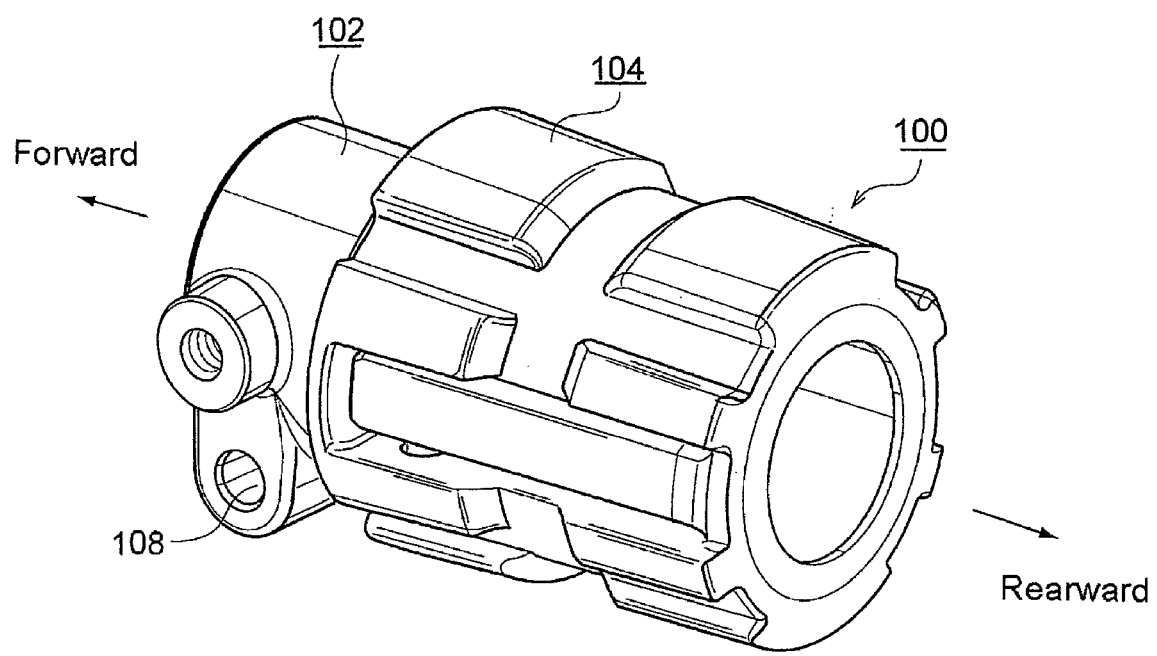
FIG. 1 is a perspective view of a pipe-shaped fixture according to an embodiment of the present invention, taken diagonally from behind.

FIG. 1 illustrates a pipe-shaped fixture 100 according to an embodiment of the present invention. Like conventional ones, a pipe-shaped fixture 100 includes a main body of 102 (hereafter called fixture body 102) of the pipe-shaped fixture and a rubber cushion 104. The rubber cushion 104 is securely fixed on the fixture body 102. More specifically, the rubber cushion 104 is formed by putting the fixture body 102 in a forming die (not shown) and filling the forming die with melted synthetic rubber material. The fixture body 102 is a molding of an aluminum alloy.

Figure 2:
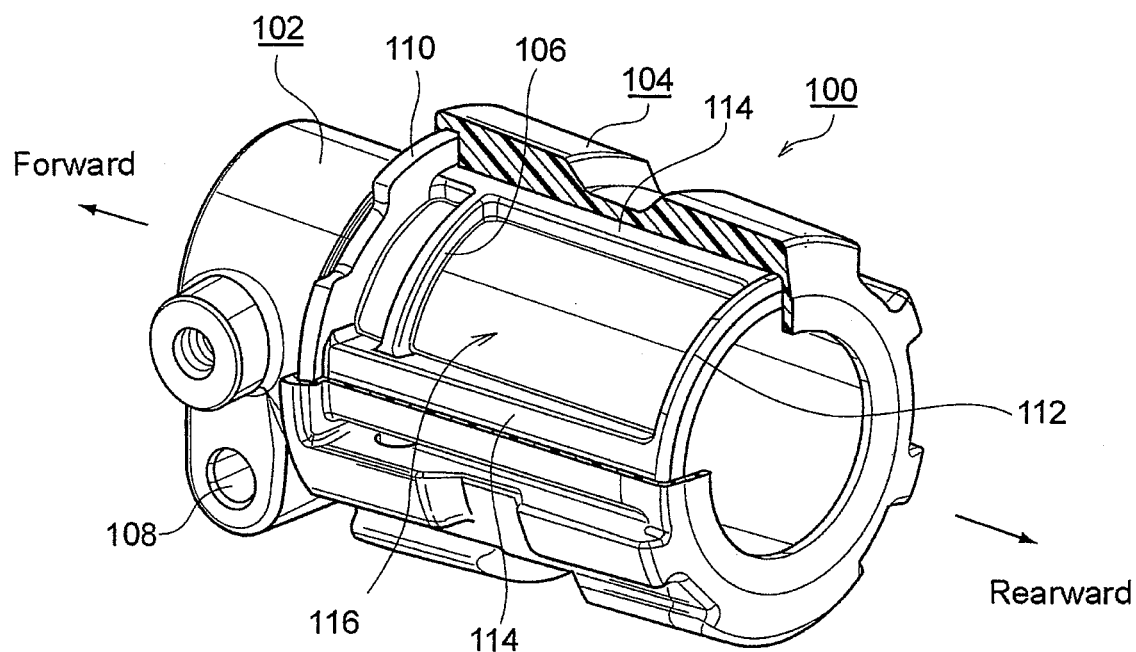
FIG. 2 is a view in which a rubber cushion included in the pipe-shaped fixture is partly cut off from the view of FIG. 1.

FIG. 2 shows the pipe-shaped fixture 100 by partly cutting the rubber cushion 104 off. The fixture body 102 has a circumferential retaining rib 106 at a lengthwise intermediate position like in the conventional one. This circumferential retaining rib 106 is not essential for the present invention, and it may be omitted where appropriate. The fixture body 102 has a fastening portion 108 formed at a front end portion like in the conventional one to receive a bolt (not shown) for screw engagement with a nut for firmly gripping the fixture body 102. The rubber cushion 104 is provided on the fixture body 102 except the front end portion.

The fixture body 102 has a projection 110 formed at a position near the front end of the rubber cushion 104, which front end is nearer to a blade (not shown) of the brush cutter. The fixture body 102 has another projection 112 formed at a position near the rear end of the rubber cushion 104, which rear end is nearer to an engine (not shown) of the brush cutter. These projections 110 and 112 project radially outward and extend circumferentially continuous. The fixture body 102 has formed thereon a plurality of longitudinal ridges 114 formed at intervals in the circumferential direction to rise from the outer circumference of the fixture body 102. These longitudinal ridges 114 each extend longitudinally to be continuous from the front-end projection 110 to the rear-end projection 112.

In the pipe-shaped fixture 100 according to this embodiment, the front projection 110 is a circumferential flange largely projecting in the radial direction to near the outer circumference of the rubber cushion 104. On the other hand, the rear-end projection 112 is a circumferential rim equal in height to the longitudinal ridges 114. The rear-end projection 112, ridge 114 and circumferential retaining rib 106 define together concavities 116 each having a rectangular form when viewed in a plane. It should be noted that the number of concavities 116 correspond to the number of the longitudinal ridges 14. It will be needless to say to the ordinary person in the art that the rubber cushion 104 fills up the concavities 116.

Figure 3:
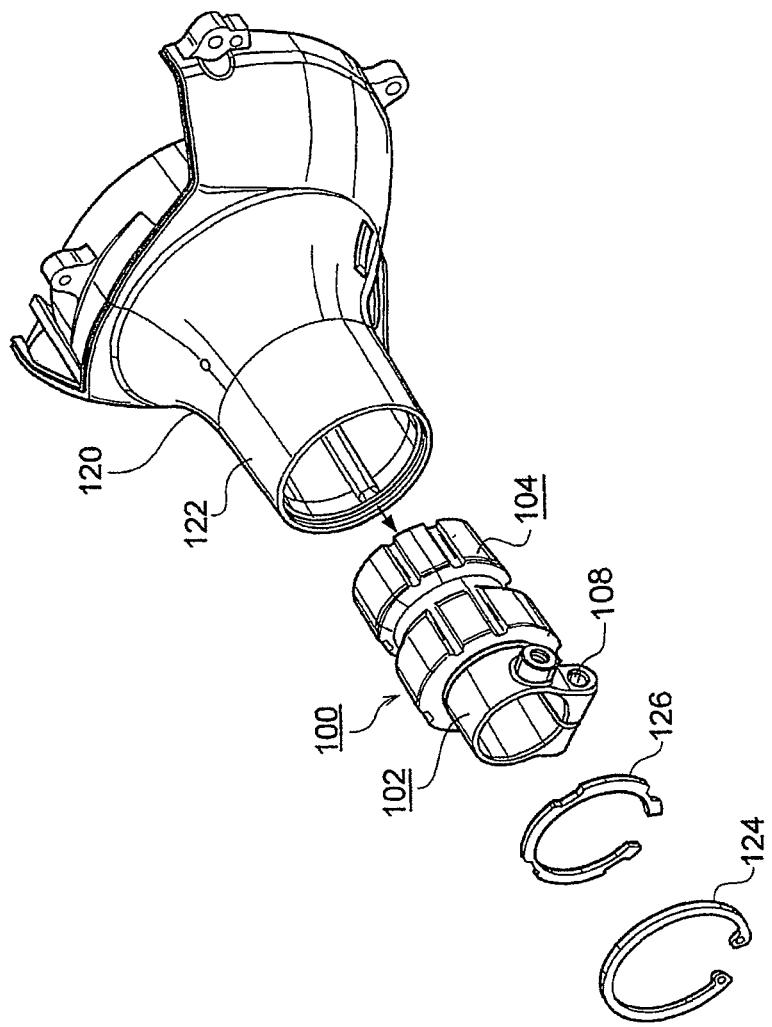
FIG. 3 is an exploded perspective view of a part of a shoulder type brush cutter using the pipe-shaped fixture according to the embodiment of the invention, which shows, together with a housing enclosing a centrifugal clutch the brush cutter, a fixture body, spacer and snap ring that are assembled in a cylindrical fixing portion of the housing.

FIG. 3 is an exploded perspective view of a part of the shoulder type brush cutter, which shows the pipe-shaped fixture 100 according to the embodiment of the invention assembled in the a cylindrical fixing portion of a housing 120 that encloses a centrifugal clutch of the brush cutter. The housing 120 is made of a magnesium alloy. Like in the conventional one, the cylindrical fixing portion 122 of the housing 120 opens forward as shown in FIG. 3. The pipe-shaped fixture 100 is inserted in the cylindrical fixing portion 122 and fixed with a snap ring 124 that is snap-fitted in a circumferential groove 125 (see FIG. 4) formed in the front end portion of the cylindrical fixing portion 122 like in the conventional one. A removable spacer ring 126 is preferably interposed between the snap ring 124 and pipe-shaped fixture 100. The pipe-shaped fixture 100 is fixed immovably in position with a slight compression force applied by the removable spacer ring 126 in the longitudinal direction. With the spacer ring 126 interposed between the snap ring 124 and pipe-shaped fixture 100, it is possible to avoid direct frictional contact of the above-mentioned front projection 110, i.e. the front circumferential flange, with the snap ring 124, thereby avoiding abrasion caused by friction of the front circumferential flange 110 with the snap ring 124.

Figure 4:
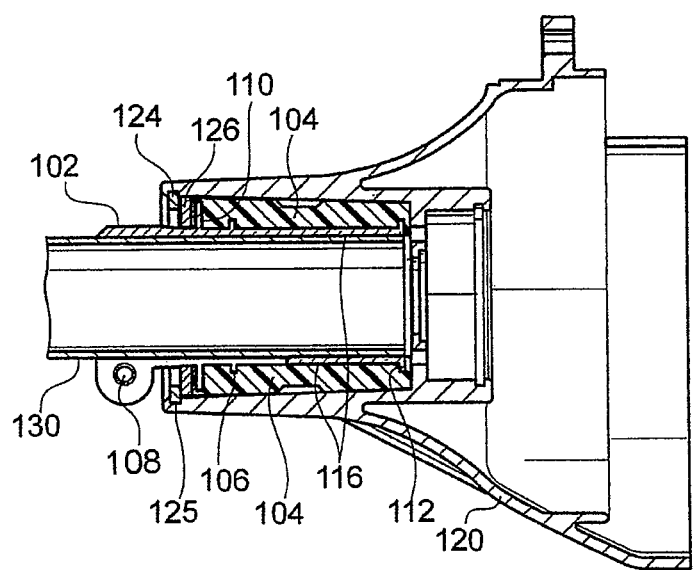
FIG. 4 is a sectional view of the pipe-shaped fixture according to the embodiment of the invention, in which an operation rod of the brush cutter is held in coupling with the housing by the pipe-shaped fixture.
Figure 8:
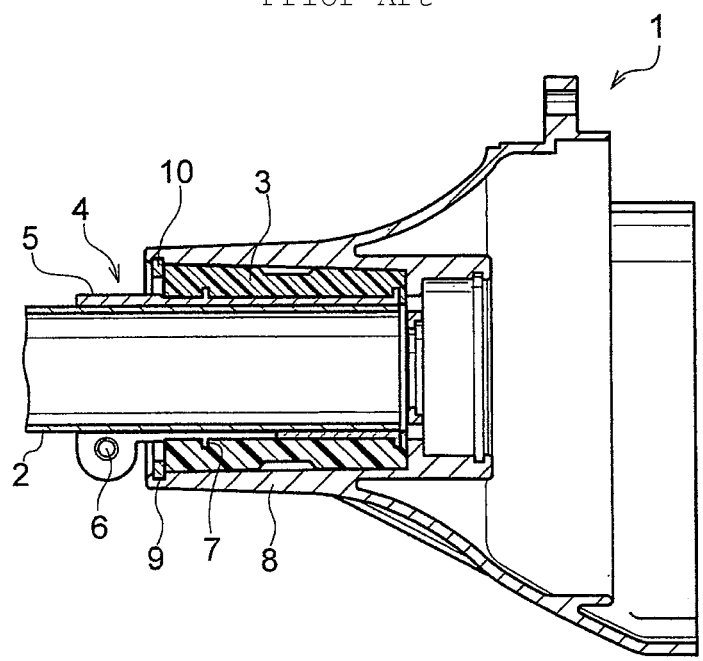
FIG. 8 is a sectional view of a conventional pipe-shaped fixture, in which an operation rod of a conventional brush cutter is held in coupling with a housing of the brush cutter by the pipe-shaped fixture.
Figure 9:
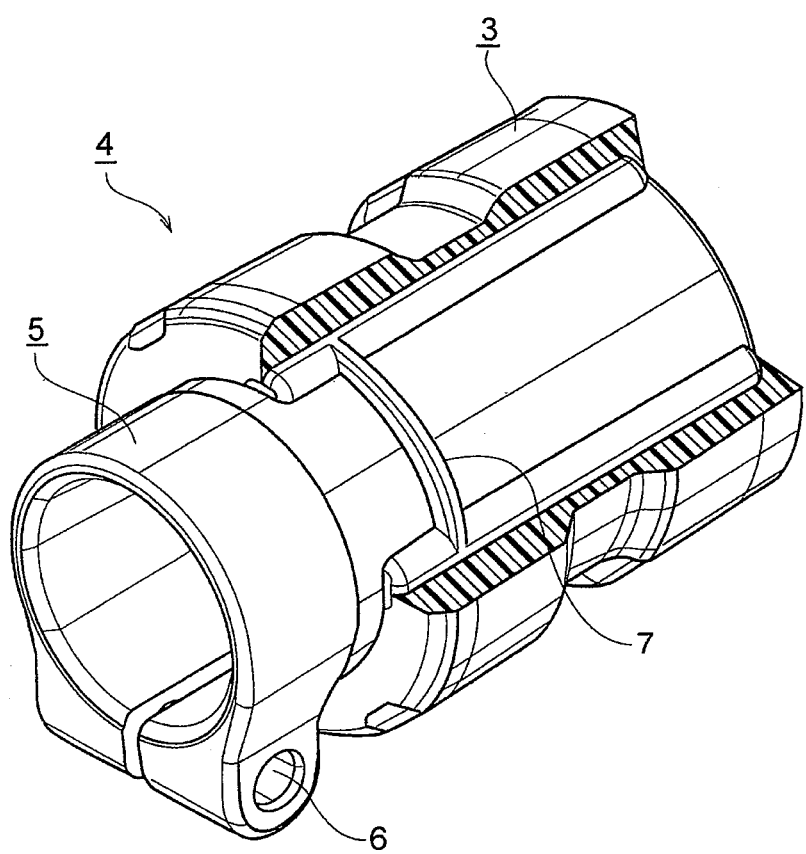
FIG. 9 is a perspective view of the conventional pipe-shaped fixture, taken from a diagonally front angle, in which a rubber cushion included in the pipe-shaped fixture is partly cut off.
Figure 10:
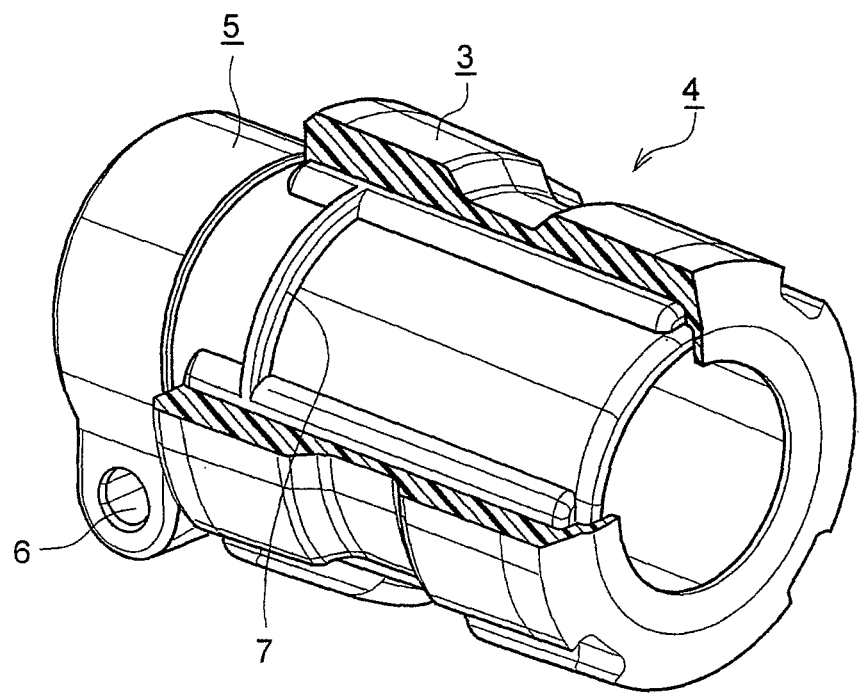
FIG. 10 is a perspective view of the pipe-shaped fixture shown in FIG. 9, taken from a diagonally rear angle.

FIG. 4 shows the pipe-shaped fixture 100 held in coupling with the housing 120 of the brush cutter. This is a diagram corresponding to FIG. 8 showing the conventional one. The rubber cushion 104 included in this embodiment is preferably formed such that a portion thereof existing in front of the front circumferential flange 110 is thin enough not to affect the longitudinal natural vibration frequency of the rubber cushion 104 itself. In other words, it is preferable that the rubber cushion 104 encloses the front circumferential flange 110. Providing such a thin rubber material before the front circumferential flange 110 makes it possible to avoid friction of the front circumferential flange 110 with the snap ring 124 and spacer ring 126 and hence avoid abrasion of the front circumferential flange 110. In an alternative, the same effect will be obtained by coating the front face of the front circumferential flange 110 with a protective film having a high resistance to abrasion or a low friction coefficient.

The above-mentioned measure is preferably provided also for the rear-end projection 112 as well. Namely, for the purpose of preventing frictional contact of the rear-end projection 112 with the housing 120, a thin film of rubber material is preferably provided at the back of the rear-end projection 112 (see FIGS. 1 and 2). Alternatively, the rear-end projection 112 may be exposed and put in abutment with the housing 120 while separating the rear-end face of the rubber cushion 104 from the wall surface of the housing 120. In this case, the rear surface of the rear-end projection 12 may be coated with a protective film having a high resistance to abrasion or a low friction coefficient.

Like in the conventional one, the cylindrical fixing portion 122 of the housing 120 has an inner circumference tapered to reduce its diameter rearward, namely, toward its deep end whereas the rubber cushion 104 is tapered in a complementary form with the inner circumference of the cylindrical fixing portion 122. When the pipe-shaped fixture 100 is inserted into the cylindrical fixing portion 122, the outer circumference of the rubber cushion 104 gets in close contact with the inner circumference of the cylindrical fixing portion 122.

Like in the conventional one, a sheath of an operation rod 130, is firmly fixed with the rear end thereof to the pipe-shaped fixture 100 according to the embodiment of the invention by bolt-and-nut engagement using a fastening portion 108 formed at a front-end portion of the fixture body 102.

In the pipe-shaped fixture 100 according to the embodiment of the invention, longitudinal vibration of the operation rod 130 relative to the cylindrical fixing portion 122 is damped while acting as a compression force on the rubber cushion 104 because of the existence of the front-end projection 110 and the rear-end projection 112 extending perpendicularly to the direction of the vibration to restrict free movements of the rubber cushion 104 and the pipe-shaped fixture 100 relative to the sheath of the operation rod 130. Therefore, it is possible to prevent lowering of the natural vibration frequency of the rubber cushion 104 with respect to the relative longitudinal vibration of the sheath of the operation rod 130. As to horizontal and vertical relative vibrations, the rubber cushion 104 exhibits the same characteristics as those of the conventional one.

Figure 5:
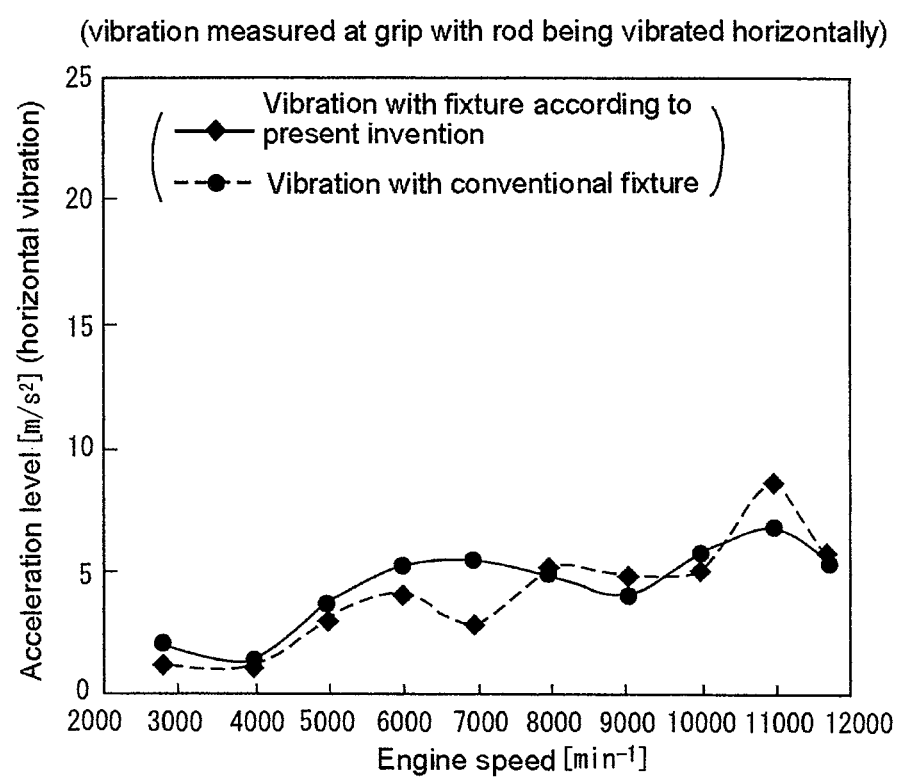
FIG. 5 is a graph that shows horizontal vibration measured at a grip of the brush cutter adopting the pipe-shaped fixture according to the embodiment of the invention.
Figure 6:
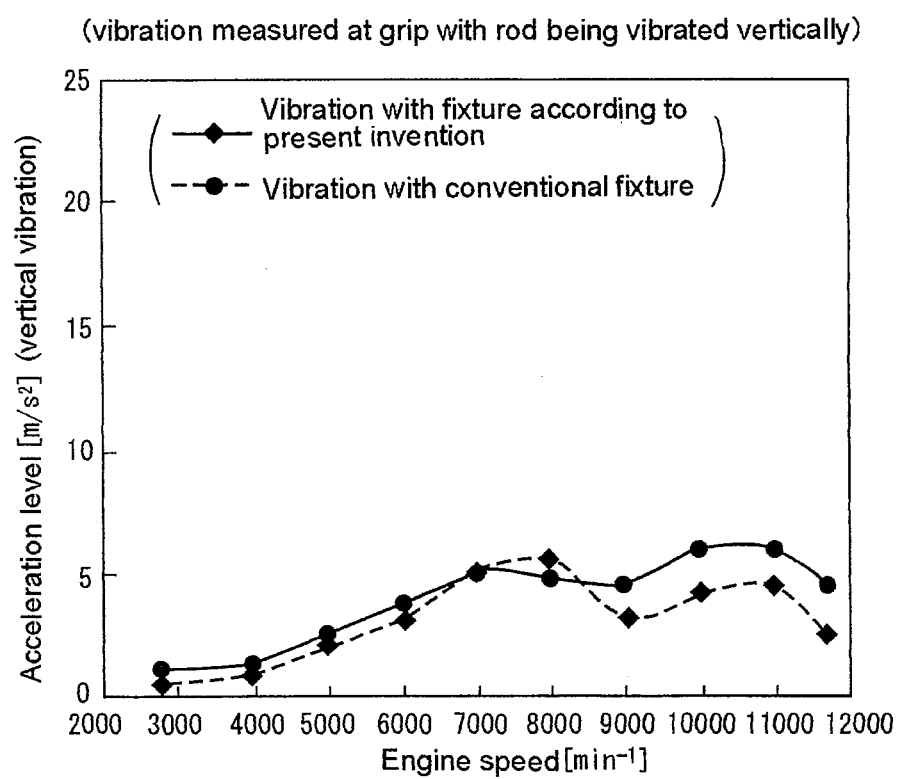
FIG. 6 is a graph that shows vertical vibration measured at the grip of the brush cutter adopting the pipe-shaped fixture according to the embodiment of the invention.
Figure 7:
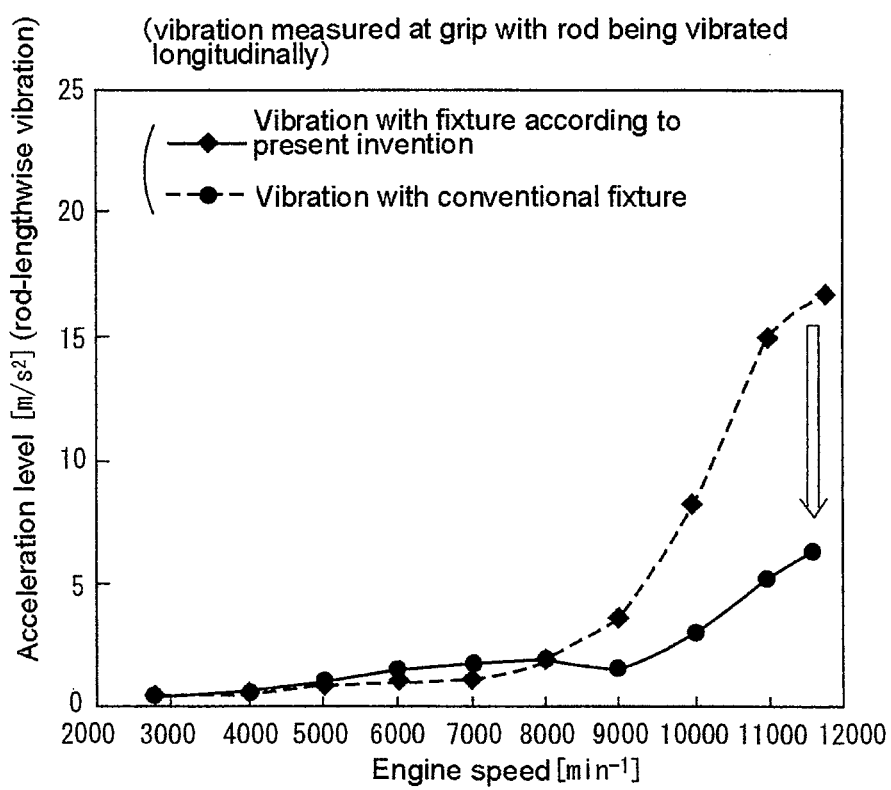
FIG. 7 is a graph that shows longitudinal vibration measured at the grip of the brush cutter adopting the pipe-shaped fixture according to the present invention.
Figure 11:
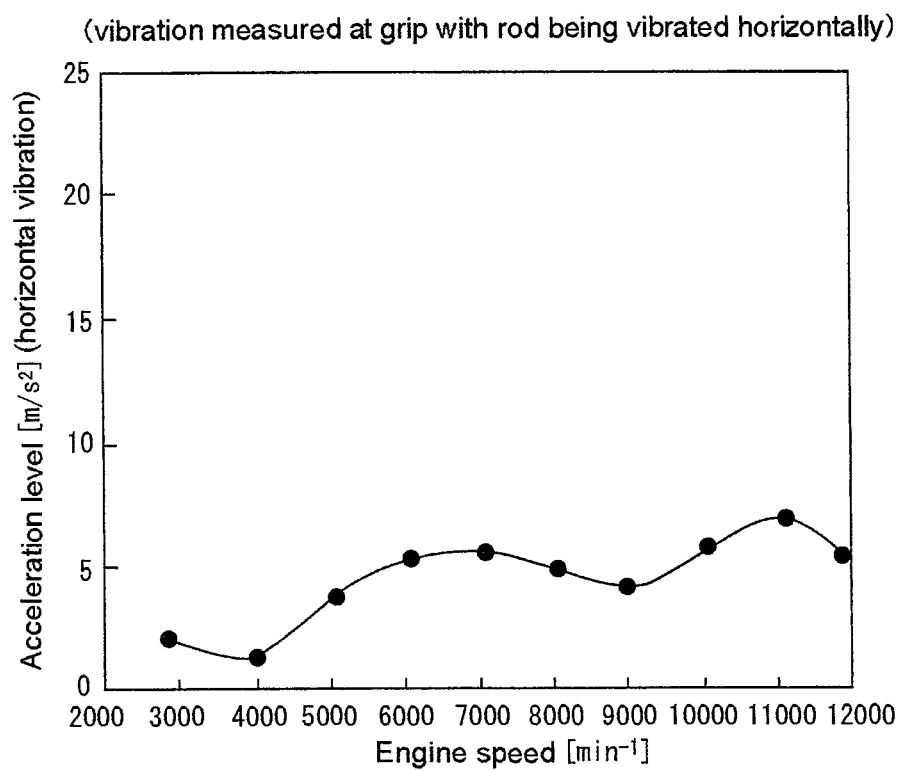
FIG. 11 is a graph that shows horizontal vibration measured at a grip of the conventional brush cutter using the conventional pipe-shaped fixture.
Figure 12:
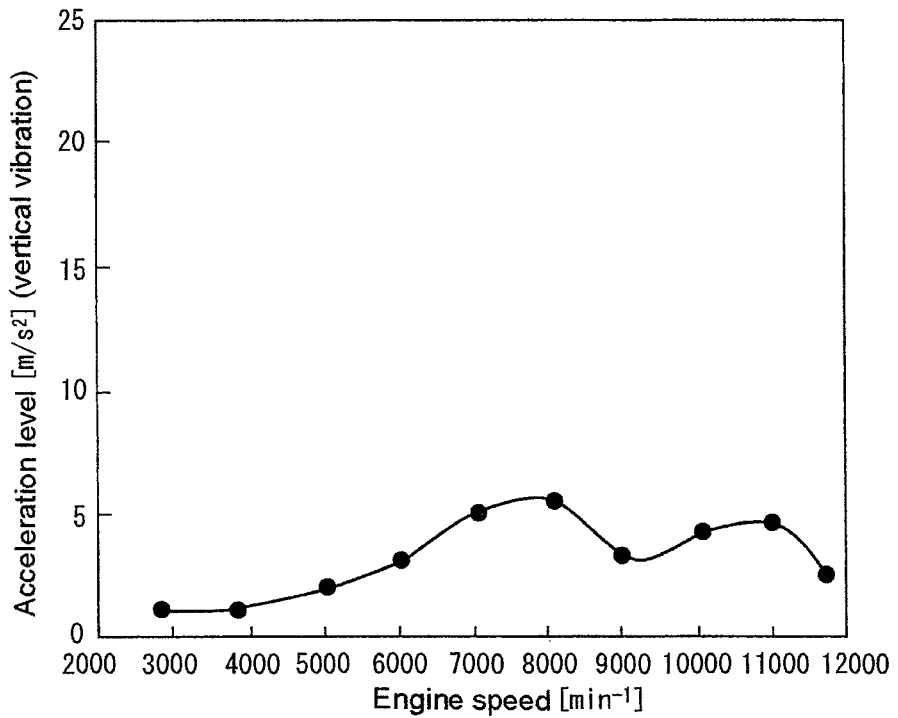
FIG. 12 is a graph that shows vertical vibration measured at the grip of the conventional brush cutter using the conventional pipe-shaped fixture.
Figure 13:
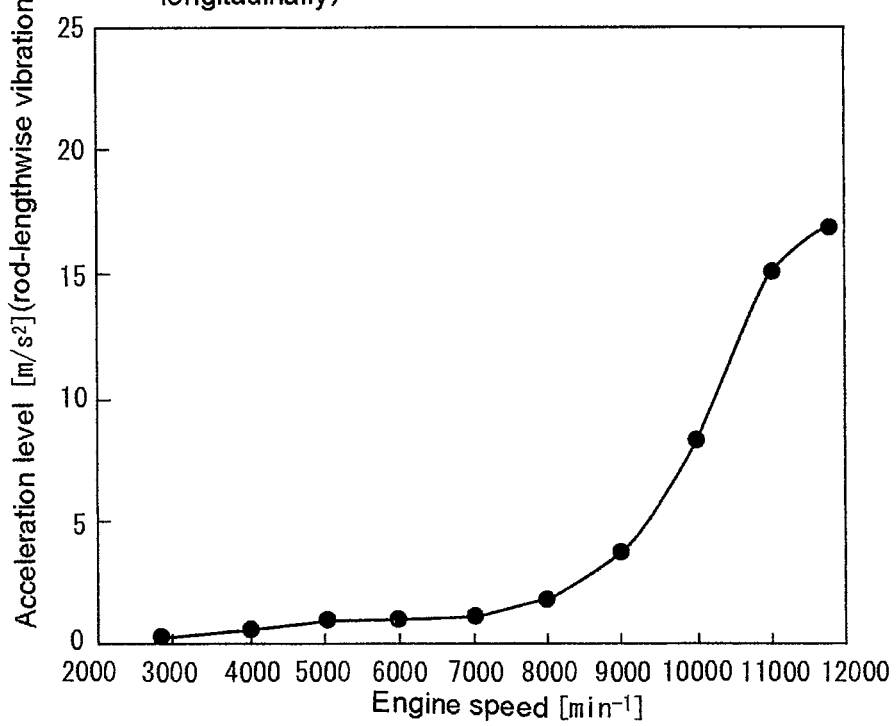
FIG. 13 a graph that shows longitudinal vibration measured at the grip of the conventional brush cutter using the conventional pipe-shaped fixture.

To confirm the above-mentioned effect of the rubber cushion 104, vibrations were measured at the grip of the operation rod 130 under the same conditions as those in the tests made on the conventional pipe-shaped fixture (previously described with reference to FIGS. 11 to 13), that is, by attaching an imbalance mass of 1.3 g to the rotary blade of the brush cutter using the pipe-shaped fixture 100 according to the embodiment of the invention. The measured data (indicated with a solid line) are shown in FIGS. 5 to 7. In FIG. 5 to 7, data taken as the results of the test made on the conventional pipe-shaped fixture (shown in FIGS. 11 to 13) are shown by a dash line for comparison with the data (indicated with the solid line) obtained with the embodiment of the present invention. These data shown in FIGS. 5 to 7 demonstrate that the same good suppressing effects are obtained for horizontal and vertical vibrations throughout low to high revolution ranges of the engine like in the conventional one. As to longitudinal vibration (FIG. 7), it is remarkable that a good suppressing effect could obtained even in the high revolution range of the engine. This proves that owing to the front and rear projections 110 and 112 provided on the fixture body 102 of the pipe-shaped fixture 100 according to the present invention, the rubber cushion 104 functions to effectively suppress the vibration without any resonance with the longitudinal vibration.

Therefore, the rubber cushion 104 of the pipe-shaped fixture 100 according to the embodiment of the invention not only exhibits effective suppressing effects of vertical and horizontal relative vibrations of the operation rod 130 but also exhibits an effective suppressing effect of longitudinal relative vibration of the operation rod 130 by performing its intrinsic vibration-absorbing capability.

Heretofore, one embodiment of the present invention has been described as enclosing the rear-end projection 112 of the fixture body 102 with the rubber cushion 104. However, this structure may be modified to expose the rear-end projection 112 and put it in abutment with the housing while separating the rear end surface of the rubber cushion 104 from the wall surface of the housing 120.

Also in connection with the height, the rear-end projection 112 may be designed in form of a flange extending radially to near the outer circumferential surface of the rubber cushion 104 like the front circumferential flange 110. In this case, the aforementioned concavity 116 may be omitted, and the rear-end projection 112 in form of the flange and the front projection 110 is preferably connected to each other by a longitudinally extending highland portion such as the ridge 114.

Industrial Applicability of The Invention

The present invention is suitably applicable to shoulder type brush cutters and furrowing machines that are work machines for making furrows in paddies as disclosed in the Japanese Patent Laid-open Publication No. 2009-235900.

What is claimed is:

1. A pipe-shaped fixture to be attached in a cylindrical fixing portion of a housing of a work machine to detachably connect an operation rod to the work machine, comprising:
   a fixture body which receives a rear end portion of the operation rod and holds it therein removably;
   a rubber cushion closely enclosing an outer circumference of the fixture body; and
   a snap ring which is snap-fitted in a circumferential groove of said cylindrical fixing portion of the housing after said fixture body is inserted in the cylindrical fixing portion,
   wherein said fixture body includes:
   a front-end projection in the form of a circumferential flange located near and enclosed by a front end of the rubber cushion and extending outwardly to a first radius,
   a rear-end projection in the form of circumferential flange located near a rear end of the rubber cushion and extending outwardly to a second radius, smaller that the first radius, and
   ridges extending longitudianally from the front-end projection to the rear-end projection to connect these projections.

2. The pipe-shaped fixture according to claim 1 further comprising a space ring interposed between said front-end projection and said snap ring.

3. The pipe-shaped fixture according to claim 1, wherein the rear-end projection is exposed and put in abutment with the housing.

4. The pipe-shaped fixture according to claim 1, wherein the rubber cushion encloses the front-end projection and the rear-end projection of the fixture body.

* * * * *